Figure 1:
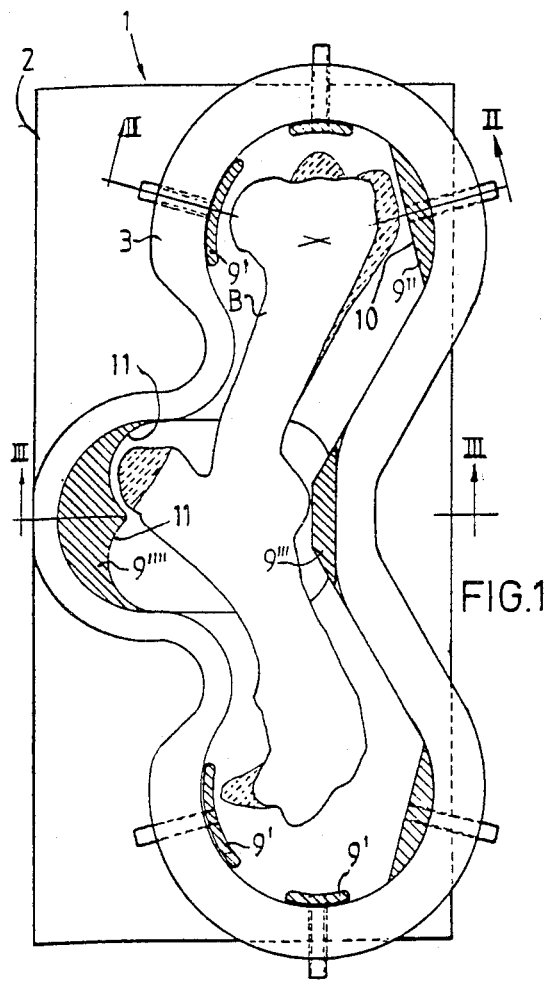

United States Patent [19]

Langen et al.

[11] Patent Number: 4,649,600
[45] Date of Patent: Mar. 17, 1987

[54] BONING DEVICE AND METHOD

[76] Inventors: Johannes C. Langen, 5431 G.C. Cuijk, Jan Van Cuijkstr 56; Christianus P. Langen, 5431 B.B. Cuijk, Zandkampen 11, Netherlands

[21] Appl. No.: 630,734

[22] Filed: Jul. 13, 1984

[30] Foreign Application Priority Data

Jul. 22, 1983 [NL] Netherlands ............ 8302628
Jan. 20, 1984 [NL] Netherlands ............ 8400198

[51] Int. Cl.$^4$ .............................................. A22C 21/00
[52] U.S. Cl. ............................................ 17/46; 17/11
[58] Field of Search ............................ 17/1 G, 11, 46

[56] References Cited

U.S. PATENT DOCUMENTS

| | | | |
|---|---|---|---|
| 2,897,536 | 8/1959 | Bergstrom et al. | 17/1 G |
| 3,665,553 | 5/1972 | Colosky | 17/46 X |
| 4,094,042 | 6/1978 | Rousseau | 17/1 G X |
| 4,137,605 | 2/1979 | Rij et al. | 17/46 |

*Primary Examiner*—Willie G. Abercrombie
*Attorney, Agent, or Firm*—Fetherstonhaugh & Co.

[57] ABSTRACT

A device for boning meat such as shoulder or rib or beef, legs of fowl or the like, said device mainly comprising a frame, a cutting element (4) arranged in said frame (4) and having a cutting edge (5) being continuous and similar to the shape of bone in the piece of meat, a counter element (3) arranged in the frame and driving means for moving the cutting element and the counter-element towards and away from one another, wherein the cutting and/or counter element (3, 4) is (are) provided within the space bounded by the cutting edge (5) with one or more arresting members (9) projecting towards the other element, so closing the space between the two elements at the critical places where sinews and/or membranes are present on the bone before the cutting operation proper takes place, and wherein and undeformable bridge piece (43) fitting in the cavity is provided on each of two yielding supporting members in order to prevent that due to the high pressure the piece of bone may break down so that bone splinters might get into the severed meat.

18 Claims, 7 Drawing Figures

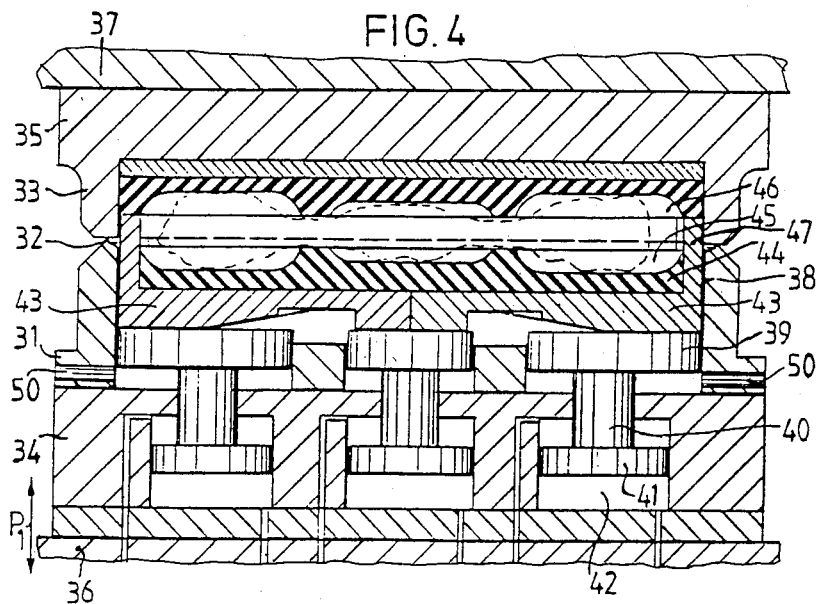
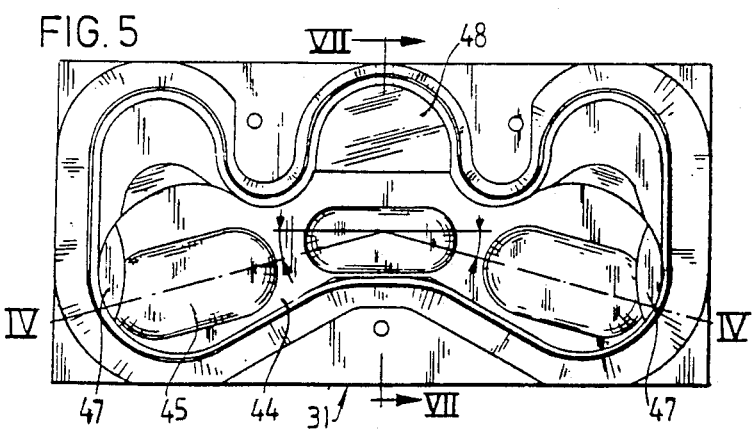
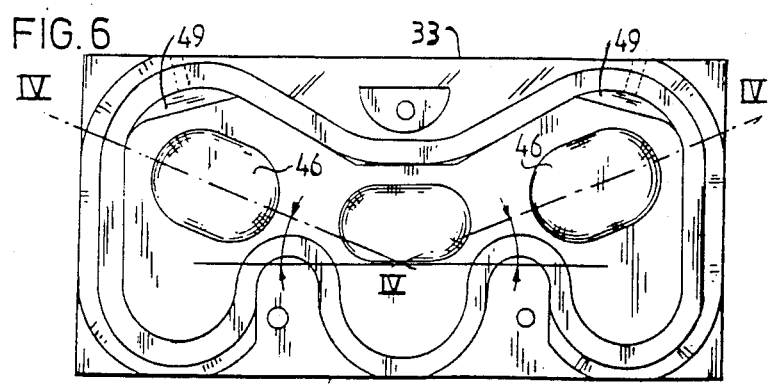

BONING DEVICE AND METHOD

The invention relates to a device for boning meat such as shoulder or rib of beef, legs of fowl or the like, said device mainly comprising a frame, a cutting element arranged in said frame and having a cutting edge being continuous and similar to the shape of bone in the piece of meat, a counter-element arranged in the frame and driving means for moving the cutting element and the counter-element towards and away from one another.

The device of the kind set forth in the preamble enables punching or cutting a bone from a piece of meat in the manner described in the copending U.S. patent application No. 462,395 Jan. 31, 1983 now U.S. Pat. No. 4,577,369.

The invention has for its object to improve the above-mentioned device so that in finally cutting the meat tissue membranes and/or sinews are not cut, but left on the bone.

The device according to the invention is distinguished in that the cutting and/or counter element is (are) provided within the space bounded by the cutting edge with one or more arresting members projecting towards the other element.

Thanks to the projecting arresting members the space between the two elements is closed at the critical places where sinews and/or members are present on the bone before the cutting operation proper takes place.

The arresting members may have any shape, for example, of a plate or a stamp.

In order to facilitate a separation between the meat to be cut off and the bone with sinews and/or membranes to be retained the edge of the arresting member may be bevelled.

If the device is equipped with a cutting and/or counter-element having each a cavity within the space enclosed by the cutting edge, which cavity is filled with a flexible mass, the invention furthermore proposes to arrange the or each arresting member between said mass and the boundary of the cavity so that the arresting member can slide along the wall of the opposite cavity. In this way co-operation is created between the projecting edge of the arresting member and the opposite, flexible mass of the other element. With such a construction fastening of the arresting member is facilitated, whereas nevertheless a satisfactory arresting effect is ensured.

Further the invention relates to a device for boning pieces of meat such as shoulder or rib pieces, legs of fowl and the like, said device comprising a frame, a cutting element arranged in said frame and having a continuous cutting edge substantially matching the shape of the bone in the piece of meat, a counter-element arranged in said frame and driving means for moving the cutting and counter-elements towards and away from one another, in which the bottom of the cavity of the cutting and/or counter-elements is provided with one or more supporting members displaceable in the direction of movement of said elements against an elastic force.

The cavity inside the cutting edge is preferably filled with elastic elements and materials which smoothly engage the piece of bone in order to move a maximum amount of meat outside the cutting edge. The problem involved is that due to the high pressure the piece of bone may break down so that bone splinters might get into the severed meat.

The invention has for its object to obviate said problem and provides a device which is distinguished in that an undeformable bridge piece fitting in the cavity is provided on each of two yielding supporting members.

The bridge piece follows the movement of two members moving differently. The bridge piece transfers these different yielding movements more uniformly to the deposited piece of bone, which prevents rupture.

In order to prevent sinews or membranes from getting beyond the cutting edge, the bridge piece is provided with extensions directed towards opposite elements and being able to operate as a retaining partition.

In a further development of the device embodying the invention the cavity of the element inside the cutting edge may furthermore be provided with firmly supported or locally rigidly supported, releasable fillers, which urge the piece of bone into the correct position during the pressing operation. Moreover, these fillers ensure a correct guide of the meat to the cutting edge.

The invention will be described more fully with reference to an embodiment.

Figure 2:
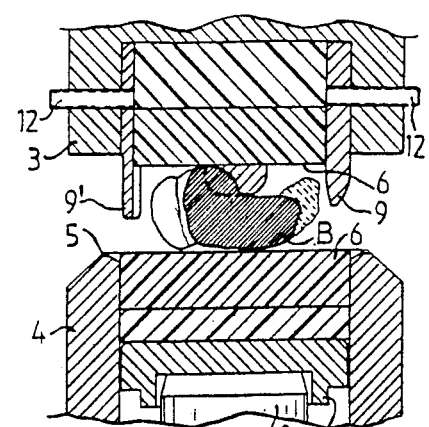
Figure 7:
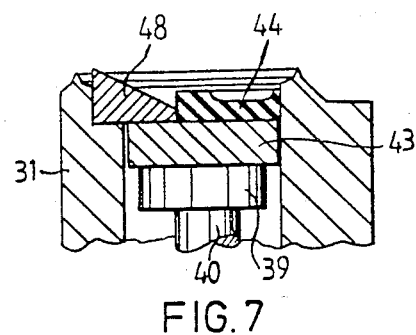
Figure 3:
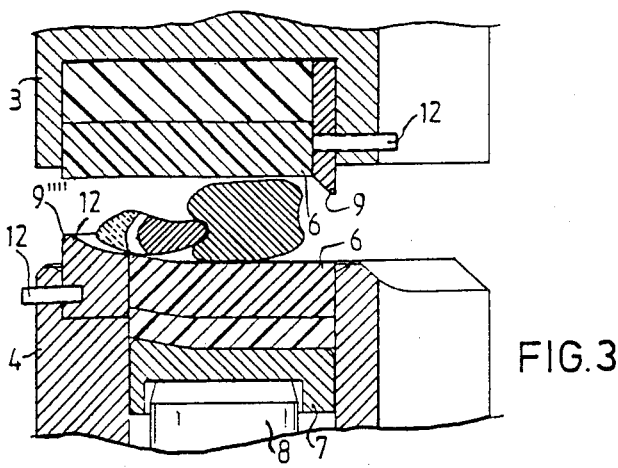

The drawing shows in:

FIG. 1 a plan view of a cutting element embodying the invention provided with arresting members, FIG. 2 a sectional view taken on the line II—II in FIG. 1, FIG. 3 a sectional view taken on the line III—III in FIG. 1, FIG. 4 a vertical sectional view of part of the device with respect to the cutting and counter elements, the sectional view of the cutting element being taken on the line V—V in FIG. 5 and VI—VI in FIG. 6, FIG. 5 a plan view of the cutting element, FIG. 6 a bottom view of the counter element, FIG. 7 a sectional view taken on the line VII—VII in FIG. 5.

Referring to the figures reference numeral 1 designates the upper counter element having a wall part 3 standing on a carrying plate 2. The shape of the wall part 3 matches the contour line around the bone B to be cut out (see FIGS. 1 and 2).

Below the counter element 1 is arranged a cutting element fastened in a similar manner to a supporting plate (not shown) and also constructed in the form of a wall part 4 corresponding with the wall part 3. The wall parts 3 and 4 constitute the cutting or punching matrices proper. The top side of the wall part 4 is bevelled and terminates in a cutting edge 5, which co-operates with the flat underside of the wall part 3 (see FIG. 2).

A cavity formed by the wall parts 3 and 4 is filled with a flexible mass 6, which may be formed by various layers of a material having relatively different elasticities. Furthermore the cutting matrix is constructed with a stamp 7 carried by a plunger 8 in order to cause the flexible layers 6 to yield during punching. The plunger 8 forms part of the hydraulic driving circuit by which also the matrices 3 and 4 are moved towards and away from one another.

According to the present invention inside the standing walls 3 and 4 of the matrices are arranged arresting elements 9 extending as far as beyond the cutting edge 5 and the underside of the matrix 3 respectively in the direction towards the opposite matrix element. The arresting elements 9 have a relatively small size and bring about an arresting effect at those places where sinews and/or membranes of the bone B might be urged laterally beyond the cutting edge 5 during the cutting operation. The arresting members may have any shape. The arresting members 9' have the shape of plates curved in accordance with the contour line of the wall part 3. On the contrary, the arresting element 9' has a lense-shaped cross-section and has a flat side 10 facing the bone. The arresting element 9''' has a trapezoidal cross-section, the top being directed towards the bone.

Finally the arresting element 9'''' has the shape of a stamp having a vaulted top face rising in outward direction. On the side facing the bone the stamp has crescent-shaped recesses 11 in which fits the projecting part of one part of the bone B.

It should be noted that the matrix with the arresting members arranged therein is specularly symmetrical with respect to the sectional line III—III (see FIG. 1) in order to permit of working the left-hand and right-hand shoulder pieces with the same matrix.

Each arresting member 9 is supported on the bottom of the cavity in the matrix of the counter element 3 or in a recess in the wall part 4 of the cutting element (see FIG. 3). In this way a firm support is ensured for the arresting members.

Moreover, each arresting member is releasably fastened by means of a screw nipple 12 in the cavity so that the matrix can be simply adapted to differently shaped bone pieces by arranging matching arresting members therein.

From the figures it is apparent that the arresting members 9 are disposed so that they exactly slide along the inner wall of the opposite matrix wall when the cutting and counter elements are driven. In this way an accurate seal is ensured because the arresting member presses by its end edge against the flexible mass.

The invention is not limited to the above-described embodiment. Within the scope of the invention an embodiment can be conceived in which the arresting elements are movably arranged in the matrix, when the flexible filling of the matrices is dispensed with.

Referring now to the FIGS. 4–7, reference numeral 31 designates the cutting element having an upwardly directed cutting edge 32. The cutting edge co-operates with the counter-element 33, the elements being pressed to one another as shown in FIG. 4 by means of a hydraulic ram (not shown).

The elements are supported by carriers 34 and 35 respectively, the carriers 34, for example, being fastened to a slide 36 reciprocated by the ram in the direction of the arrow P1, whereas the carrier 35 is rigidly secured in the frame 37 of the device.

The cavity 38 of the cutting element 31 accomodates a plurality of supporting members 39 movable in the direction of the arrow P1 and having the shape of a stamp. Each stamp 39 is carried by a pin 40 connected with a bender 41, which is operative in a cylindrical space 42 in the carrier 34.

The size and the shape of the stamps 39 depend on the place accompanied thereby in the cavity 38 of the cutting element.

At least two stamps are provided each with a bridge piece 43, the bridge piece being covered by a layer of elastic material 44. The layer 44 may have cavities 45 for receiving thick parts of the piece of bone, for example, joints between the bones.

The counter element is also provided with recesses 46. The recesses 45, 46 of the cutting and counter elements respectively need not be directly located one above the other, they may be relatively off-set in the horizontal plane. This depends on the shape of the thickeneed piece of bone and it contributes to an improved positioning or clamping of the piece of bone during pressing.

The bridge piece 43 may be locally provided along the circumference with raised parts projecting towards the counter element and extending above the elastic layer 44, said parts 47 being indicated in the drawing at the ends of the bridge pieces.

There may furthermore be provided filling pieces 48, which may have any shape and which are preferably removable from the cavity 38 so that they can be replaced by other pieces in accordance with other kinds of meat to be treated.

The filling piece 48 may, as a whole, be firmly supported in the element. As shown in FIG. 7 the filling piece 48 may lie on the one hand on a projecting face of the element and on the other hand on the top face of the bridge piece 43. As a further alternative the support may be provided by the yielding members 39, 40.

The cavity in the counter element may also be provided with filling pieces 49 having a bone and meat guiding function respectively.

The device described above operates as follows:

After the cutting elements 31 on the slide 36 has been lowered, a space is formed between the two elements so that the piece of meat to be processed can be deposited on the cutting element 31. The user has to arrange the piece of bone above the cavity 8 of the cutting element, after which he actuates the device so that the cutting element 31 is moved upwards in the direction of the arrow P1. The piece of the bone itself finds the cavities 45 and 46 respectively and if the piece of bone comprises two pivoting bones, it assumes the positions indicated by the lines V—V and VI—VI respectively.

During the further upward movement, before the cutting edge reaches the counter element, the rams 42 are energized by supplying a fluid so that the stamps 39 are moved upwards and press the piece of bone by high pressure between the elastic layers 44. The residual meat is moved beyond the cutting edge 32, after which the meat is severed. Sinew and connective tissue are retained inside the cutting edge 32 by the extensions 47 of the bridge piece 43 and the filling pieces 48, 49 respectively.

Bone fracture is now avoided since the nonuniform, vertical movements of the stamps 39 are averaged because the piece of bone is lying on a bridge piece 43. It will be obvious that the bridge pieces 43 can freely tilt in the cavity 38 so that the supporting face on the top face of the bridge pieces 43 may be sharply bent.

The filling piece 48 will also perform a tilting movement in clockwise direction (FIG. 7), which movement ensures correct centering of the bone. During pressing after the establishment of the contact of the cutting element with the counter element meat residues will assembly in the pressing cavity and be conducted away through passages 50.

The invention is not limited to the embodiments described above.

What is claimed is:

1. A device for boning pieces of meat such as shoulder or rib pieces, legs of fowl or the like, said device mainly comprsing a frame, cutting element arranged in said frame and having a bone supporting face, a continuous cutting edge matching the shape of the bone in the piece of meat and extending about the perimeter of the bone supporting face and projecting outwardly there-from, a counter element arranged in said frame and driving means for moving the cutting and counter elements towards and away from one another, characterized in that the cutting and/or the counter element is (are) provided within the space bounded by the cutting edge with one or more arresting members projecting outwardly beyond said bone supporting face and directed towards the other element.

2. A device as claimed in claim 1, characterized in that the arresting element is releasably fastened to the associated element.

3. A device as claimed in claim 1 in which the cutting and/or the counter element has (have) within the space bounded by the cutting edge a cavity filled with a flexible mass characterized in that the or each arresting member is arranged between the mass and the wall of the cavity so that the arresting member can slide along the wall of the opposite cavity.

4. A device as claimed in claim 1 characterized in that the end edge of the arresting member is bevelled.

5. A device as claimed in claim 1 characterized in tha the arresting member has the shape of a plate.

6. A device as claimed in claim 1 characterized in that the arresting member has the shape of a stamp.

7. A device for boning pieces of meat, such as shoulder and rib pieces, legs of fowl and the like, said device comprising a frame, a cutting element arranged therein and having a continuous cutting edge of a shpae substantially similar to that of the bone in the piece of meat, a counter element arranged in said frame and driving means for moving the cutting and counter elements towards and away from one another, in which the bottom of the cavity of the cutting and/or counter elements bounded by the cutting edge is provided with one or more members acting against an elastic force in the direction of movement of the elements characterized in that an undeformable bridge piece is arranged on each of at least two yielding supporting members.

8. A device as claimed in claim 7, characterized in that the or each bridge piece is covered by an elastic layer.

9. A device as claimed in claim 7, characterized in that the bridge piece is provided with extensions directed towards the opposite element and extending as far as above the elastic layer.

10. A device as claimed in claim 7, characterized in that the cavity of the element is provided with one or more releaseable filling pieces firmly supported in the cutting element.

11. A device as claimed in claim 9, characterized in that the cavity of the element is provided with one or more filling pieces firmly supported one the one hand by the element and on the other hand by a bridge piece or a yielding supporting member.

12. A device as claimed in claim 7, characterized in that an elastic pressure layer is arranged in the counter element, the opposite elastic layers having recesses for receiving thickened bone parts.

13. A device as claimed in claim 12, characterized in that the opposite recesses are relatively off-set.

14. A device as claimed in claim 7, characterized in that the cavity of at least the cutting element has outwardly opening passages.

15. A boning device for removing meat from a meat bearing bone suth as a pork shoulder, ribs, legs of fowl or the like comprising;

(a) a pair of boning dies mounted for movement toward and away from one another between an open and a closed position,
(b) a resiliently yieldable insert mounted in each die,
(c) a bone support face formed on each resiliently yieldable insert, said bone support faces being disposed opposite one another and adapted to engage a meat bearing bone located therebetween when said dies are moved toward one another,
(d) meat severing means located on one of said dies for severing the meat when said dies are in said closed position, said meat severing means extending about the perimeter of said meat supporting faces,
(e) at least two compression members mounted on one of said dies in a spaced relationship with respect to its resiliently yieldable insert, said compression members being laterally spaced from one another, said compression members being operable to move independently with respect to one another from a retracted position to an extended position to press the support faces toward one another to apply a boning load to a meat bearing bone in use,
(d) bridging means bridging said compression members, said bridging means being located between said compression members and their associated resiliently yieldable insert, said bridging means being movable relative to said compression members, supports to distribute the boning load across said resiliently yieldable insert while permitting relative movement between the compression members.

16. A boning device for removing meat from a meat bearing bone such as a pork shoulder, ribs, legs or fowl or the like comprising;

(a) a pair of boning dies mounted for movement toward and away from one another between an open and a closed position.
(b) a resiliently yieldable insert mounted in each die,
(c) a bone support face formed on each resiliently yieldable insert, said bone support faces being disposed opposite one another and adapted to engage a meat bearing bone located therebetween when said dies are moved toward one another,
(d) meat severing means located on one of said dies for severing the meat when said dies are in said closed position, said meat severing means extending about the perimeter of said bone supporting faces,
(e) an arresting member mounted on one of said dies inwardly of said perimeter and projecting outwardly from its bone support face toward the other die so as to close against the bone support face of the other dies before said dies are fully closed to clamp and retain any sinew which is located therebetween prior the final closing of the dies to sever the meat in use.

17. A boning device for removing meat from a meat bearing bone such as a pork shoulder, ribs, legs of fowl or the like comprising;

(a) upper and lower boning members mounted for movement of one toward the other between an open and a closed position,
(b) a bone support face on said lower boning member, said bone support face being disposed opposite a complementary face of said upper boning member, said bone support face and said complementery face engaging the meat of a meat bearing bone located therebetween when said boning members are moved toward said closed position, (c) meat severing means associated with said boning members for severing the meat from the bone in use when said boning members are in said closed position, (d) a plurality of arresting members mounted on said lower boning member and projecting outwardly from said bone support face toward said upper boning member at spaced intervals about said bone support surface, said arresting members engaging said upper boning member before said boning members are fully closed so as to prevent movement of any part of the bone into contact with the meat severing means as the boning members move to the closed position.

18. A boning device for removing meat from a meat bearing bone such as a pork shoulder, ribs, legs of fowl or the like comprising;

(a) upper and lower boning members mounted for movement of one toward the other between an open and a closed position, (b) a resiliently yieldable insert mounted in at least one of said boning members, (c) a bone support face on the lower of said boning members said bone support face being disposed opposite a complementary face of said upper boning member, one of said faces being formed on said resiliently yieldable insert, said bone support face and said complementery face engaging the meat of a meat bearing bone located therebetween when said boning members are moved toward said closed position to expel said meat, (d) meat severing means associated with said boning members for severing the meat which is expelled from the bone in use when said boning members are in said closed position, (e) a plurality of bone arresting members mounted on said lower boning member and projecting outwardly from said bone support face toward said upper boning member at spaced intervals about said bone support surface, said arresting members engaging said upper boning member before said boning members are fully closed so as to prevent movement of any part of the bone into contact with the meat severing means as the boning members move to the closed position, (f) at least two compression members mounted on one of the boning member in which said resiliently yieldable insert is mounted so as to be spaced with respect to said resiliently yieldable insert, said compression members being laterally spaced from one another, said compression members being operable to move independently with respect to one another from a retracted position to an extended position to press said faces toward one another to apply a meat expelling load to a meat bearing bone in use, (g) bridging means bridging said compression members, said bridging means being located between said compression members and said resiliently yieldable insert, said bridging means being movable relative to said compression members to distribute the boning load across said resiliently yieldable insert while permitting relative movement between the compression members.

* * * * *